US012002363B2

(12) United States Patent
Okubo et al.

(10) Patent No.: US 12,002,363 B2
(45) Date of Patent: Jun. 4, 2024

(54) INFORMATION PROCESSING APPARATUS, NON-TRANSITORY STORAGE MEDIUM, AND INFORMATION PROCESSING METHOD (71) Applicant: TOYOTA JIDOSHA KABUSHIKI KAISHA, Toyota (JP)

(72) Inventors: Atsushi Okubo, Nisshin (JP); Kento Nitta, Tokyo (JP); Takaaki Kato, Saitama (JP); Daiki Kaneichi, Tokyo (JP); Minoru Nakadori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 28 days.

(21) Appl. No.: 17/658,998

(22) Filed: Apr. 12, 2022

(65) Prior Publication Data
US 2022/0335832 A1    Oct. 20, 2022

(30) Foreign Application Priority Data
Apr. 15, 2021   (JP) .................................. 2021-069325

(51) Int. Cl.
G08G 1/16    (2006.01)
G06T 11/00   (2006.01)
G08G 1/14    (2006.01)

(52) U.S. Cl.
CPC .............. G08G 1/168 (2013.01); G06T 11/00 (2013.01); G08G 1/142 (2013.01)

(58) Field of Classification Search
None
See application file for complete search history.

(56) References Cited

U.S. PATENT DOCUMENTS

2013/0162829 A1*  6/2013  Kadowaki ............... H04N 7/18
                                                              348/148
2018/0211539 A1*  7/2018  Boss ....................... G08G 1/168
2020/0143140 A1*  5/2020  Sakanashi ............... G08G 1/146

FOREIGN PATENT DOCUMENTS

JP    2003-296898 A    10/2003
JP    2009139983 A     6/2009
JP    2016118851 A     6/2016
JP    2016-143393 A    8/2016

* cited by examiner

Primary Examiner — Thomas S McCormack
(74) Attorney, Agent, or Firm — Dickinson Wright, PLLC (57) ABSTRACT An information processing apparatus communicable with the vehicle includes one or more processors. The one or more processors are configured to: detect the vehicle before parking; determine the characteristic of the detected vehicle or the characteristic of a driver of the vehicle; set a parking frame for the vehicle in accordance with the characteristic; and transmit information indicating the parking frame to the vehicle.

8 Claims, 9 Drawing Sheets

| VEHICLE ID | CHARACTERISTIC OF VEHICLE | CHARACTERISTIC OF DRIVER |
|---|---|---|
| 2A | TOTAL LENGTH 4.7 m<br>TOTAL WIDTH 1.7 m<br>HINGED DOOR | Null |
| 2B | TOTAL LENGTH 3.4 m<br>TOTAL WIDTH 1.5 m<br>SLIDING DOOR | LOAD AND UNLOAD LUGGAGE |
| ⋮ | ⋮ | ⋮ |

INFORMATION PROCESSING APPARATUS, NON-TRANSITORY STORAGE MEDIUM, AND INFORMATION PROCESSING METHOD

CROSS-REFERENCE TO RELATED APPLICATION

This application claims priority to Japanese Patent Application No. 2021-069325 filed on Apr. 15, 2021, incorporated herein by reference in its entirety.

BACKGROUND

1. Technical Field

The disclosure relates to a vehicle, an information processing apparatus, a non-transitory storage medium, and an information processing method.

2. Description of Related Art

In the related art, a parking lot management system that includes a sensor identifying the size of a vehicle and with which it is possible to guide a vehicle to a parking area corresponding to the size of the vehicle is known (for example, Japanese Unexamined Patent Application Publication No. 2003-296898 (JP 2003-296898 A)).

SUMMARY

In the above-described technique, the size of each parking area is fixed. Therefore, there is room for improvement in efficiency of accommodation of a vehicle in a parking lot.

The present disclosure provides an information processing apparatus, a non-transitory storage medium, and an information processing method with which it is possible to improve the efficiency of accommodation in a parking lot.

A first aspect of the present disclosure relates to an information processing apparatus communicable with a vehicle. The information processing apparatus includes one or more processors that are configured to: detect the vehicle before parking; determine the characteristic of the detected vehicle or the characteristic of a driver of the vehicle; set a parking frame for the vehicle in accordance with the characteristic; and transmit information indicating the parking frame to the vehicle.

In the information processing apparatus according to the first aspect of the present disclosure, the one or more processors may be configured to superimpose the parking frame on an image captured by an imaging unit of the vehicle based on the information indicating the parking frame and cause a display unit of the vehicle to display a superimposed image.

In the information processing apparatus according to the first aspect of the present disclosure, the characteristic of the vehicle may include the size of the vehicle and the one or more processors may be configured to set the parking frame to secure at least the size of the vehicle.

In the information processing apparatus according to the first aspect of the present disclosure, the characteristic of the vehicle may be a door opening and closing method of the vehicle and the one or more processors may be configured to set the parking frame at a position where an additional width needed to open and close a door is secured between the vehicle and an adjacent vehicle.

In the information processing apparatus according to the first aspect of the present disclosure, the characteristic of the driver may include a characteristic that the driver loads and unloads a luggage and the one or more processors may be configured to set the parking frame at a position where an additional width needed to load and unload the luggage is secured between the vehicle and an adjacent vehicle.

In the information processing apparatus according to the first aspect of the present disclosure, the parking frame may include a margin width for the driver of the vehicle to pass after getting off the vehicle.

In the information processing apparatus according to the first aspect of the present disclosure, the one or more processors may be configured to set the parking frame in a parking lot, one or more light emitting bodies may be embedded in a road surface of the parking lot, and the one or more processors may be configured to cause a light emitting body to emit light, the light emitting body being part of the one or more light emitting bodies and being embedded at a position corresponding to the parking frame.

A second aspect of the present disclosure relates to a vehicle in which the above-described information processing apparatus is mounted.

A third aspect of the present disclosure relates to a non-transitory storage medium storing instructions that are executable by one or more processors included in an information processing apparatus communicable with a vehicle and that cause the one or more processors to perform functions including determining the characteristic of the vehicle or the characteristic of a driver of the vehicle in a case where the vehicle before parking is detected, setting a parking frame for the vehicle in accordance with the characteristic, and transmitting information indicating the parking frame to the vehicle.

In the non-transitory storage medium according to the third aspect of the present disclosure, the functions may include superimposing the parking frame on an image captured by an imaging unit of the vehicle based on the information indicating the parking frame and causing the display unit of the vehicle to display a superimposed image.

In the non-transitory storage medium according to the third aspect of the present disclosure, the characteristic of the vehicle may include the size of the vehicle and the functions may include setting the parking frame to secure at least the size of the vehicle.

In the non-transitory storage medium according to the third aspect of the present disclosure, the characteristic of the vehicle may be a door opening and closing method of the vehicle and the functions may include setting the parking frame at a position where an additional width needed to open and close a door is secured between the vehicle and an adjacent vehicle.

In the non-transitory storage medium according to the third aspect of the present disclosure, the characteristic of the driver may include a characteristic that the driver loads and unloads a luggage and the functions may include setting the parking frame at a position where an additional width needed to load and unload the luggage is secured between the vehicle and an adjacent vehicle.

In the non-transitory storage medium according to the third aspect of the present disclosure, the parking frame may include a margin width for the driver of the vehicle to pass after getting off the vehicle.

A fourth aspect of the present disclosure relates to an information processing method executed by an information processing apparatus communicable with a vehicle. The information processing method includes detecting the vehicle before parking, determining the characteristic of the vehicle or the characteristic of a driver of the vehicle, setting the parking frame for the vehicle in accordance with the characteristic, and transmitting information indicating the parking frame to the vehicle.

The information processing method according to the fourth aspect may further include superimposing the parking frame on an image captured by an imaging unit of the vehicle based on the information indicating the parking frame and causing the display unit of the vehicle to display the superimposed image.

In the information processing method according to the fourth aspect of the present disclosure, the characteristic of the vehicle may include the size of the vehicle and the parking frame may be set to secure at least the size of the vehicle.

In the information processing method according to the fourth aspect of the present disclosure, the characteristic of the vehicle may be a door opening and closing method of the vehicle and the parking frame may be set at a position where an additional width needed to open and close a door is secured between the vehicle and an adjacent vehicle.

In the information processing method according to the fourth aspect of the present disclosure, the characteristic of the driver may include a characteristic that the driver loads and unloads a luggage and the parking frame may be set at a position where an additional width needed to load and unload the luggage is secured between the vehicle and an adjacent vehicle.

In the information processing method according to the fourth aspect of the present disclosure, the parking frame may include a margin width for the driver of the vehicle to pass after getting off the vehicle.

With the information processing apparatus, the non-transitory storage medium, and the information processing method according to the aspects of the present disclosure, it is possible to improve the efficiency of accommodation in a parking lot.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
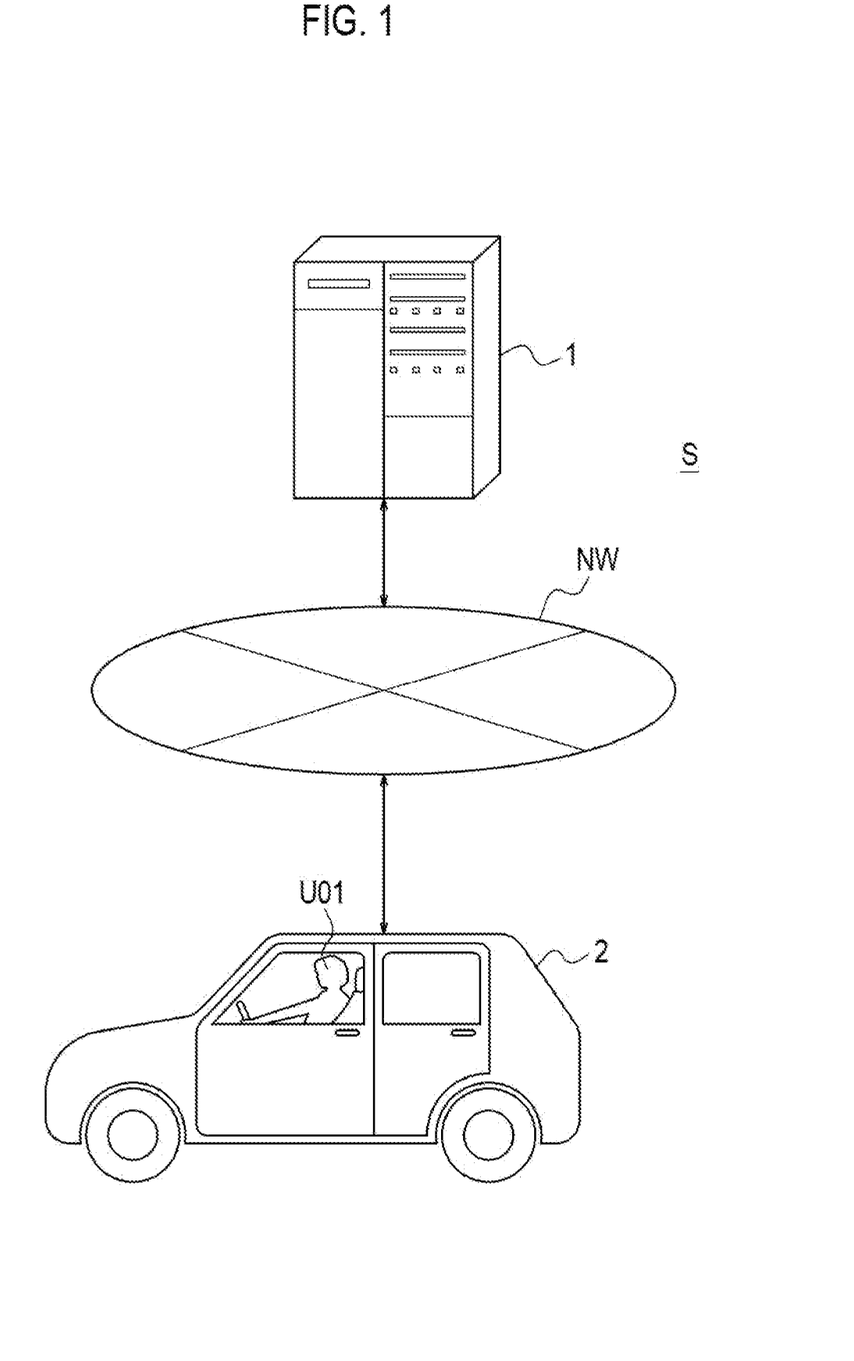
FIG. 1 is a schematic diagram of an information processing system.

FIG. 1 is a schematic diagram of an information processing system S of the present embodiment. The information processing system S includes an information processing apparatus 1 and a vehicle 2 that can communicate with each other via a network NW. Examples of the network NW include a mobile communication network and the Internet.

In FIG. 1, for the sake of simplicity of description, one information processing apparatus 1 and one vehicle 2 are shown. However, the number of information processing apparatuses 1 and the number of vehicles 2 are not limited thereto. For example, processing that is executed by the information processing apparatus 1 in the present embodiment may be executed by a plurality of information processing apparatuses 1 disposed in a dispersive manner.

The outline of the processing executed by the information processing apparatus 1 of the present embodiment will be described. In a case where the vehicle 2 before parking is detected, a controller 11 of the information processing apparatus 1 determines the characteristic of the vehicle 2 or the characteristic of a driver of the vehicle 2, sets a parking frame for the vehicle 2 in accordance with the characteristic, and transmits information indicating the parking frame to the vehicle 2. With such a configuration, the information processing apparatus 1 can variably set a parking frame in accordance with the characteristic of the vehicle 2 and thus the size of each parking frame can be reduced to the minimum size needed. Therefore, with the information processing apparatus 1, it is possible to increase the number of vehicles accommodated in a parking lot and improve the efficiency of accommodation.

The information processing apparatus 1 is installed in a facility such as a data center. The information processing apparatus 1 is a computer such as a server belonging to a cloud computing system or another computing system. As an alternative example, the information processing apparatus 1 may be mounted in the vehicle 2.

Figure 2:
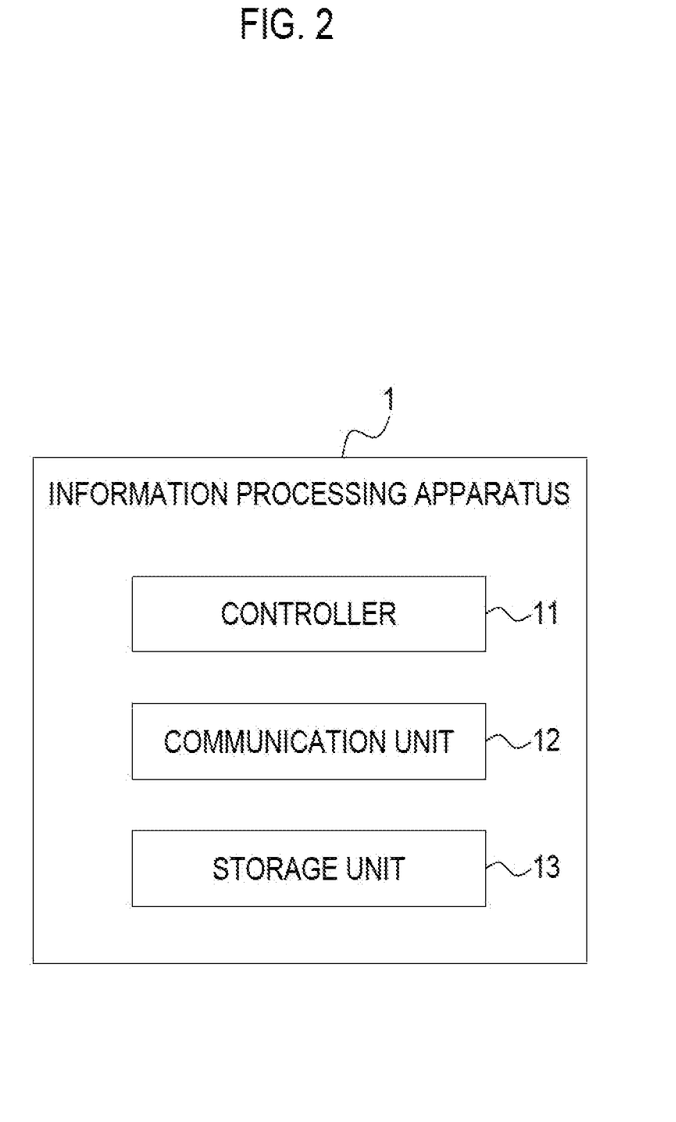
FIG. 2 is a block diagram showing a configuration of an information processing apparatus.

With reference to FIG. 2, the internal configuration of the information processing apparatus 1 will be described in detail.

The information processing apparatus 1 includes the controller 11, a communication unit 12, and a storage unit 13. Components of the information processing apparatus 1 are connected to each other such that the components can communicate with each other via, for example, a dedicated line.

The controller 11 includes, for example, one or more general-purpose processors including a central processing unit (CPU) or a micro processing unit (MPU). The controller 11 may include one or more dedicated processors specialized for specific processing. The controller 11 may include one or more dedicated circuits instead of including the processor. The dedicated circuit may be, for example, a field-programmable gate array (FPGA) or an application specific integrated circuit (ASIC). The controller 11 may include an electronic control unit (ECU). The controller 11 transmits and receives any information via the communication unit 12.

The communication unit 12 includes a communication module conforming to one or more wired or wireless local area network (LAN) standards for connection to the network NW. The communication unit 12 may include a module conforming to one or more mobile communication standards including Long Term Evolution (LTE), the 4th Generation (4G), and the 5th Generation (5G). The communication unit 12 may include a communication module or the like conforming to one or more short-distance communication standards or specifications including Bluetooth (a registered trademark), AirDrop (a registered trademark), IrDA, ZigBee (a registered trademark), FeliCa (a registered trademark), and RFID. The communication unit 12 transmits and receives any information via the network NW.

The storage unit 13 includes, for example, a semiconductor memory, a magnetic memory, an optical memory, or a combination of at least two of a semiconductor memory, a magnetic memory, and an optical memory. However, the present disclosure is not limited thereto. The semiconductor memory is, for example, a random-access memory (RAM) or a read-only memory (ROM). The RAM is, for example, a static random-access memory (SRAM) or a dynamic random-access memory (DRAM). The ROM is, for example, an electrically erasable programmable read-only memory (EEPROM). The storage unit 13 may function as a main storage device, an auxiliary storage device, or a cache memory, for example. The storage unit 13 may store information on the result of analysis or processing executed by the controller 11. The storage unit 13 may store various items of information and the like related to the operation or control of the information processing apparatus 1. The storage unit 13 may store a system program, an application program, embedded software, and the like. The storage unit 13 may be provided outside the information processing apparatus 1 and be accessed from the information processing apparatus 1. The storage unit 13 includes a characteristic DB which will be described later.

Examples of the vehicle 2 include any type of motor vehicle such as a micromobility device, a gasoline vehicle, a diesel vehicle, an HV, a PHV, an EV, and an FCV. Components of the vehicle 2 are connected to each other such that the components can communicate with each other via, a vehicle-mounted network such as a controller area network (CAN) or a dedicated line. The "HV" is an abbreviation of "hybrid vehicle". The "PHV" is an abbreviation of "plug-in hybrid vehicle". The "EV" is an abbreviation of "electric vehicle". The "FCV" is an abbreviation of "fuel cell vehicle". The vehicle 2 of the present embodiment is driven by a driver. As an alternative example, the driving of the vehicle 2 may be automated at any level. The level of automation is, for example, any of level 1 to level 5 in the level classification of the SAE. The "SAE" is an abbreviation of "society of automotive engineers". The vehicle 2 may be a vehicle dedicated to MaaS. The "MaaS" is an abbreviation of "mobility-as-a-service". The vehicle 2 may be, for example, a bicycle, a motorized bicycle, or a motorcycle.

Figure 3:
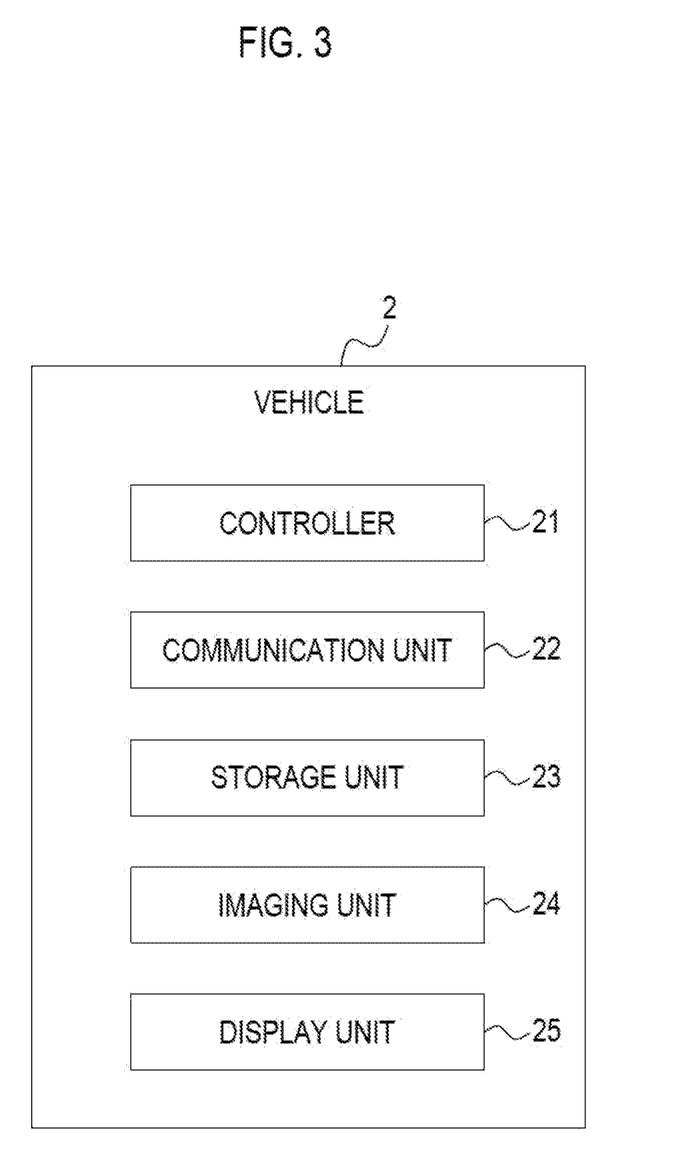
FIG. 3 is a block diagram showing a configuration of a vehicle.

With reference to FIG. 3, the internal configuration of the vehicle 2 will be described in detail.

The vehicle 2 includes a controller 21, a communication unit 22, a storage unit 23, an imaging unit 24, and a display unit 25. Components of the vehicle 2 are connected to each other such that the components can communicate with each other via, for example, a dedicated line.

The hardware configurations of the controller 21, the communication unit 22, and the storage unit 23 of the vehicle 2 may be the same as the hardware configurations of the controller 11, the communication unit 12, and the storage unit 13 of the information processing apparatus 1. Here, descriptions thereof will be omitted.

The imaging unit 24 includes a camera. The imaging unit 24 can image the vicinity of the imaging unit 24. The camera may image a space in front of the vehicle 2 or may image a space behind the vehicle 2 as a back guide monitor. The imaging unit 24 may record a captured image in the storage unit 23 or transmit the captured image to the controller 21 for image analysis. Examples of the Image include a still image and a moving image.

The display unit 25 is, for example, a display. The display is, for example, an LCD or an organic EL display. The display unit 25 may be a car navigation display provided in the vehicle. The "LCD" is an abbreviation of "liquid crystal display". The "EL" is an abbreviation of "electroluminescence". The display unit 25 outputs an image obtained through the operation of the vehicle 2. The image may be an image of a car navigation system or an image of a back guide monitor. The display unit 25 may be connected to the vehicle 2 as an external output device instead of being provided in the vehicle 2. As a connection method, for example, any method such as USB, HDMI (registered trademark), or Bluetooth (registered trademark) can be used. The display unit 25 may be a display of a smartphone operated by a user U01. The image may be displayed by means of a smartphone application.

As an alternative example, the display unit 25 may be a head-up display (HUD) mounted in the vehicle 2. The display unit 25 includes, for example, a combiner. The display unit 25 projects a virtual image into a real space. The display unit 25 may output information obtained through the operation of the vehicle 2.

As another alternative example, the display unit 25 may be an augmented reality (AR) glass that is mounted and operated by the driver of the vehicle 2.

Hereinafter, processing executed by the information processing system S of the present embodiment will be described in detail. Here, a case where the vehicle 2 to be parked has arrived at a parking lot will be described.

At an entrance of the parking lot, a camera that can communicate with the information processing apparatus 1 is installed. The camera transmits a captured image to the information processing apparatus 1. The controller 11 of the information processing apparatus 1 analyzes the captured image to detect the vehicle 2 before parking. For example, the controller 11 detects the number of the vehicle 2 from an analysis image to specify the vehicle 2.

As an alternative example, the controller 11 may detect the vehicle 2 before parking from position information of the vehicle 2. Specifically, the controller 11 may detect that the vehicle 2 will be parked when the vehicle 2 enters the parking lot. The controller 11 specifies the vehicle 2 while referring to registration information of the vehicle 2.

Figure 4:
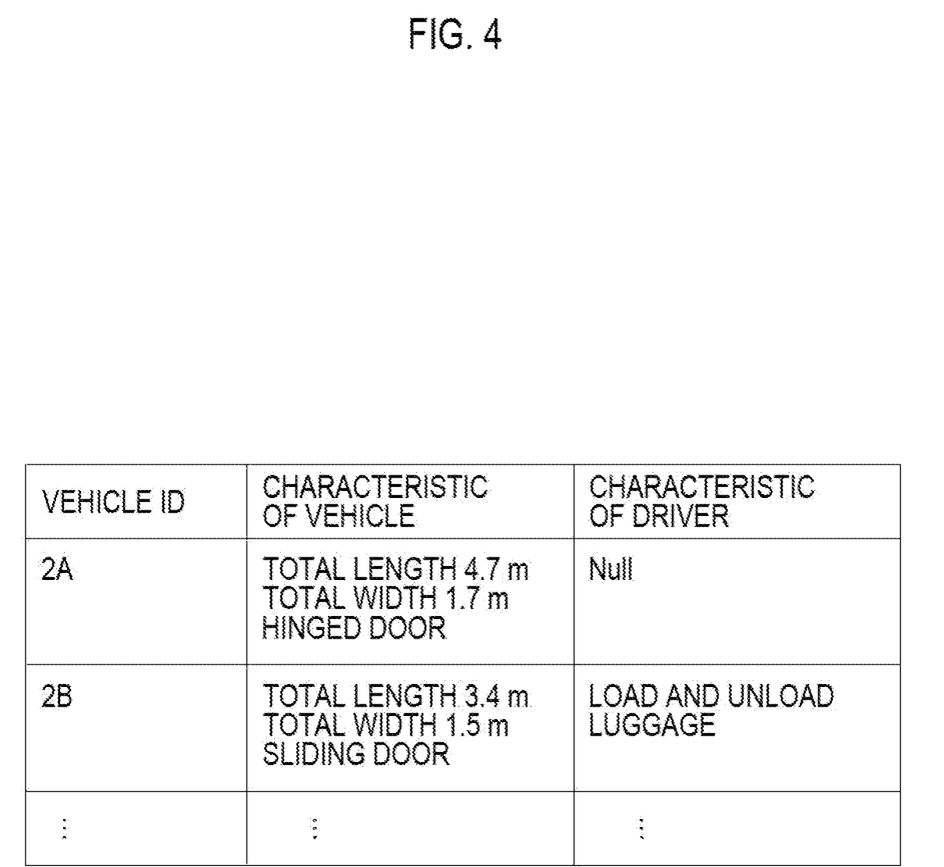
FIG. 4 is a table showing a data structure of a characteristic database (DB)

When the vehicle 2 is specified, the controller 11 refers to the storage unit 13. As shown in FIG. 4, in a characteristic DB of the storage unit 13, the characteristic of vehicles and the characteristic of the drivers (here, the user U01) of the vehicles are stored in association with vehicles ID. A vehicle 2A and a vehicle 2B are examples of the vehicle 2. As the characteristic of the vehicle 2A, the size of the vehicle 2A and a door opening and closing method are stored. The size here includes the total length and the total width. The opening and closing method here is a hinged door. As the characteristic of the vehicle 2B, the size of the vehicle 2B and a door opening and closing method are stored. The opening and closing method here is a sliding door. As a characteristic of the driver of the vehicle 2B, a characteristic that the driver loads and unloads a luggage is stored.

The controller 11 determines the characteristic of the vehicle 2 or the characteristic of the driver of the vehicle 2 while referring to the storage unit 13.

Figure 5:
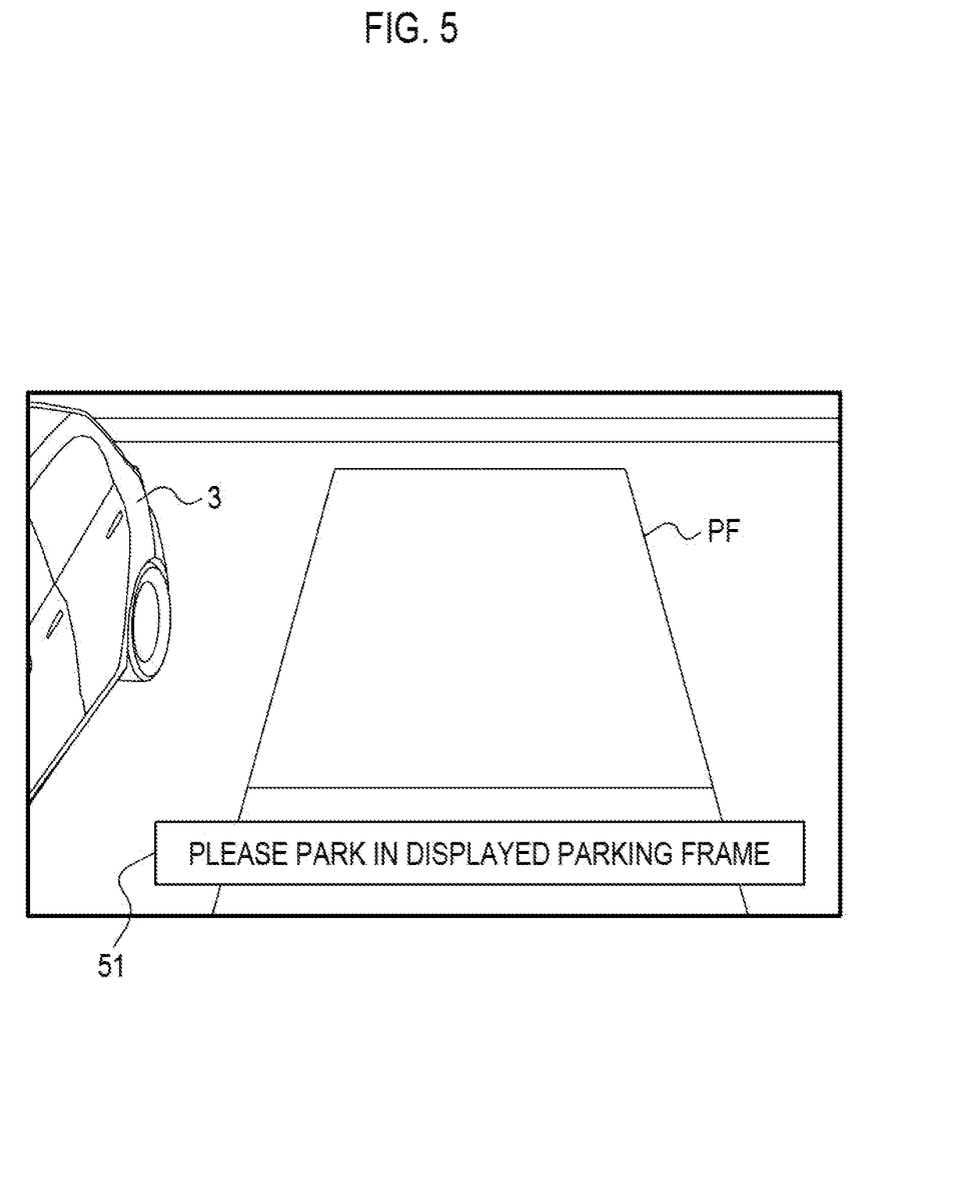
FIG. 5 is a diagram showing an example of a displayed parking frame.

The controller 11 sets a parking frame in accordance with the determined characteristic. The specific method of setting the parking frame will be described later. The controller 11 transmits information indicating the parking frame to the vehicle 2. In a case where the display unit 25 is a display, as shown in FIG. 5, the parking frame PF is displayed by the display unit 25 when the vehicle 2 receives information indicating the parking frame PF. The parking frame PF is a virtual line. At this time, the parking frame PF may be superimposed on an image of the vicinity of the vehicle 2 captured by the imaging unit 24. At this time, an annotation 51 urging the driver to park in the parking frame PF may be displayed by the display unit 25.

In a case where the display unit 25 is a HUD, the display unit 25 may project a virtual image indicating the parking frame PF into a real space.

As another alternative example, the controller 11 may cause a light emitting body to emit light, the light emitting body being part of light emitting bodies (for example, LEDs) embedded in a road surface of the parking lot and being embedded at a position corresponding to the parking frame PF.

Figure 6:
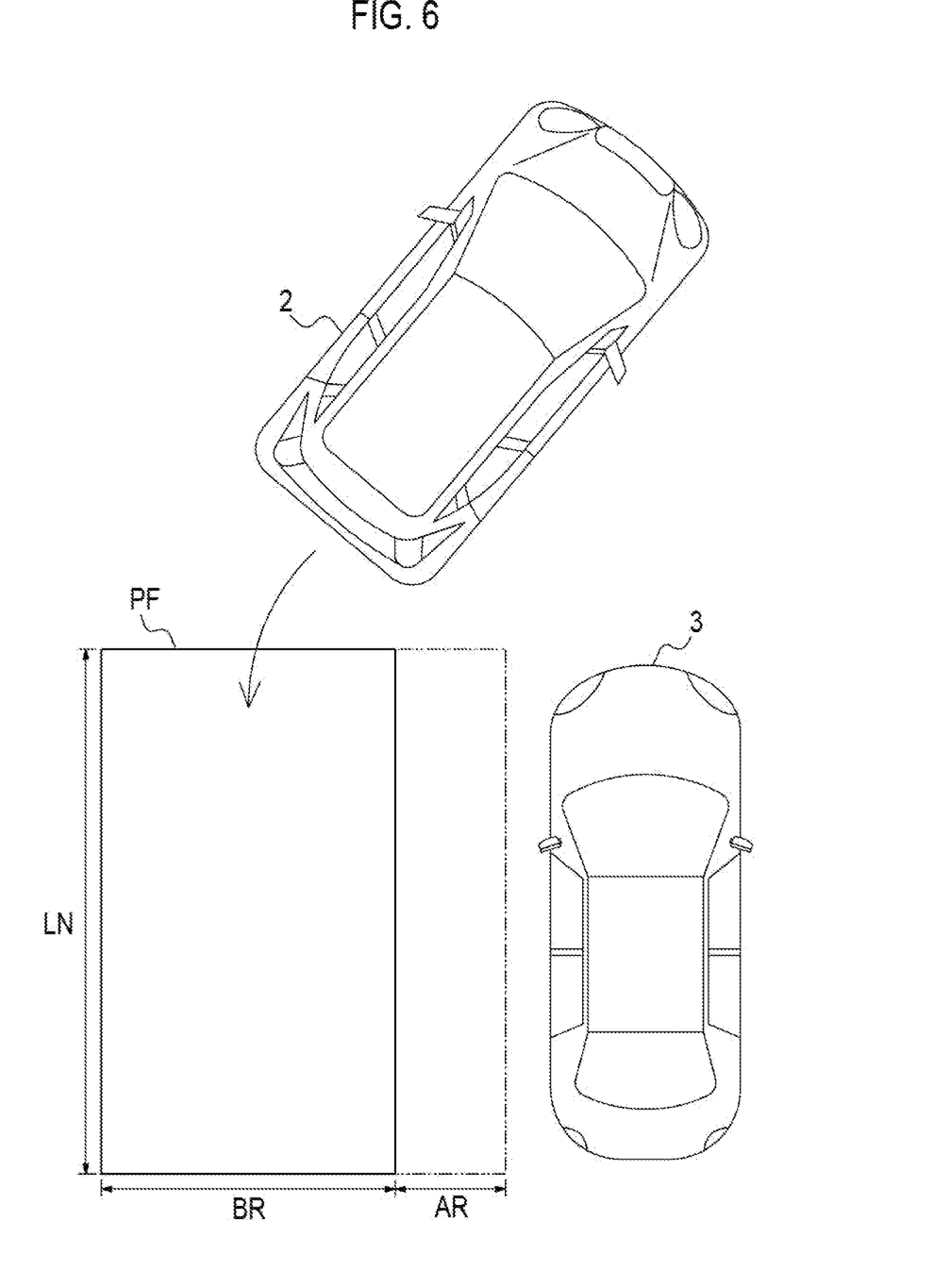
FIG. 6 is a diagram showing an example of parking.

As a method of setting the parking frame PF, the controller 11 may set the parking frame PF securing at least the size of the vehicle 2. At this time, the size of the parking frame PF may be set to fall within a range of 75% to 125% of an area in the related art. As shown in FIG. 6, the parking frame PF has a depth LN and a width BR. The depth LN is equal to or larger than the total length of the vehicle 2. The width BR is equal to or larger than the total width of the vehicle 2. The size of the parking frame PF may coincide with the size of the vehicle 2, and the parking frame PF may have a margin width for the user U01, who is the driver of the vehicle 2, to pass after getting off the vehicle 2. The value of the margin width may be a predetermined value and may be a value corresponding to the physique of the user U01. Here, a situation where the user U01 gets off the vehicle 2 to a space to the right of the vehicle 2 will be described. Therefore, the margin width is secured for a space to the right of the vehicle 2. Whether to secure the margin width for the space to the right of the vehicle 2, a space to the left of the vehicle 2, or both of the spaces can be set in any manner. The same applies to an additional width AR which will be described later.

As an additional example, as shown in FIG. 6, the controller 11 may set the parking frame PF in a state where the additional width AR is secured between the vehicle 2 and a parked adjacent vehicle 3. In a case where there is no adjacent vehicle 3, the additional width AR may be secured between the vehicle 2 and a wall or a curb. The closer the vehicle 2 is to the adjacent vehicle 3 in a state where the additional width AR is secured, the more the size of a surplus space is reduced and the more the accommodation efficiency of the parking lot is improved. A specific example of the additional width AR will be described with reference to FIGS. 7 and 8.

Figure 7:
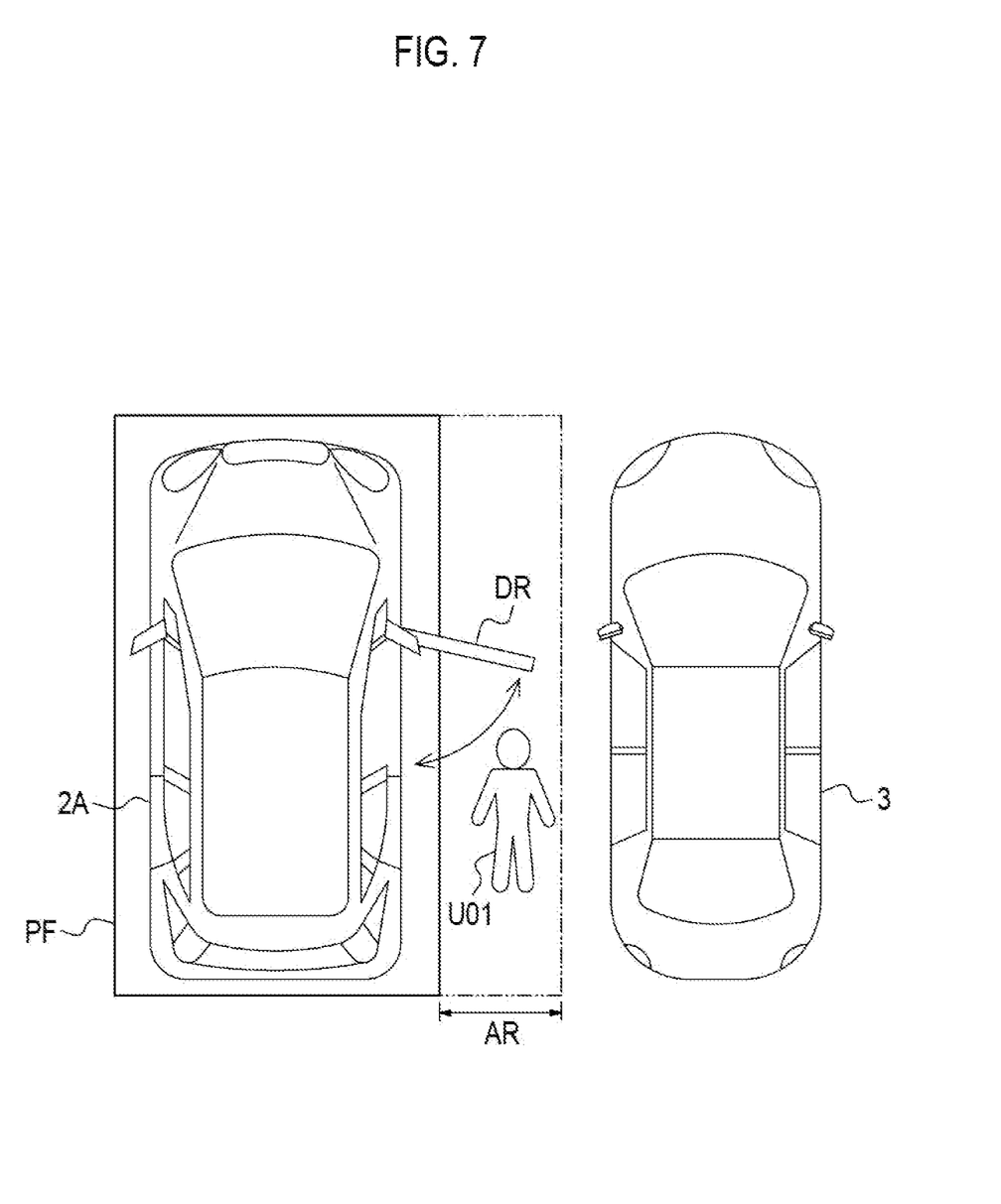
FIG. 7 is a diagram showing an example of an additional width.

For example, as shown in FIG. 7, a door DR of the vehicle 2A is a hinged door. In this case, the controller 11 may set the parking frame PF at a position where the additional width AR for the opening and closing of the door DR is secured. The value of the additional width AR may be a value registered by the user U01 or the like in advance.

Figure 8:
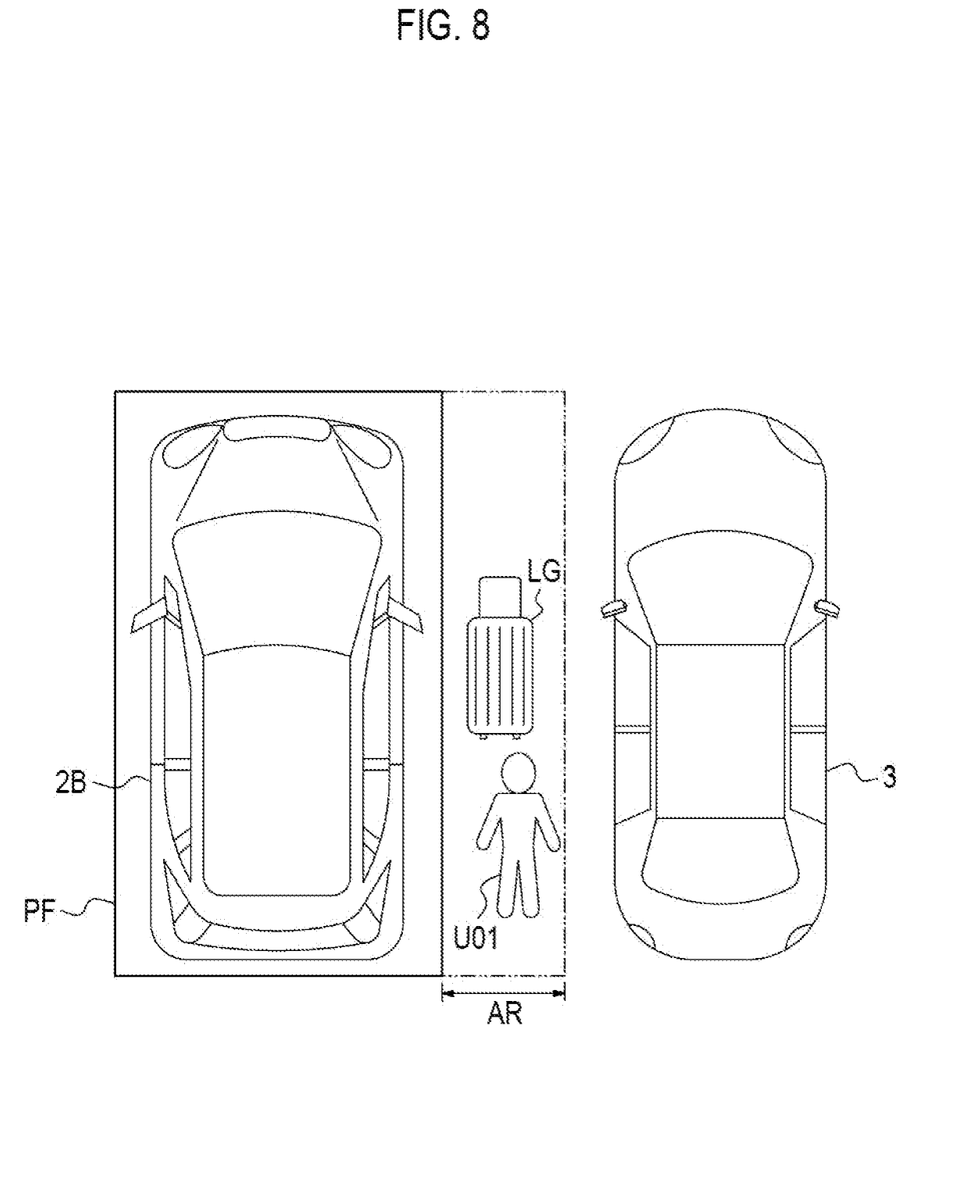
FIG. 8 is a diagram showing another example of the additional width.

As shown in FIG. 8, the user U01 of the vehicle 2B loads and unloads a luggage LG. In this case, the controller 11 may set the parking frame PF at a position where the additional width AR for the loading and unloading of the luggage LG is secured. The value of the additional width AR may be a value registered by the user U01 or the like in advance.

As an alternative example, the predetermined additional width AR may be secured in a case where a characteristic of a driver is that the user U01 is not good at parking. In another alternative example, the predetermined additional width AR may be secured on a side where a child gets off the vehicle 2 in a case where a characteristic of the driver is that the user U01 is with the child. Whether or not the user U01 is with the child may be determined by means of a camera or a seat sensor provided in the vehicle 2.

Figure 9:
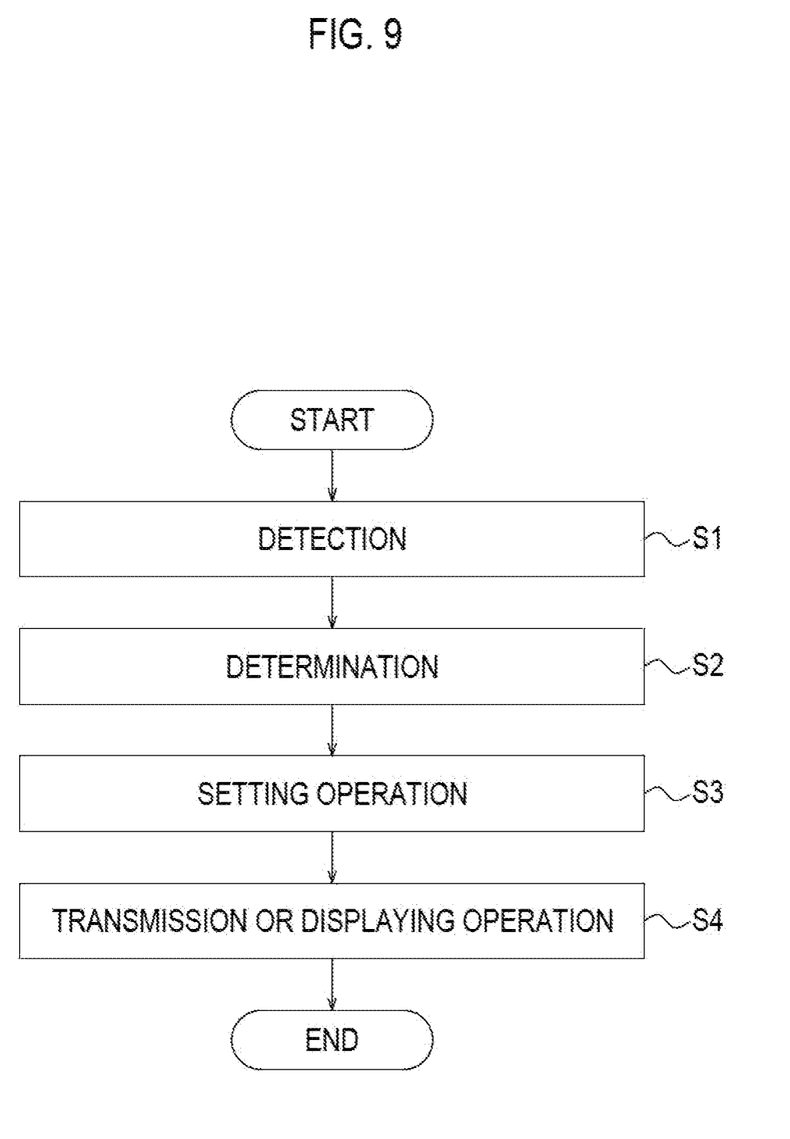
FIG. 9 is a flowchart showing the operation of the information processing apparatus.

An information processing method executed by the information processing apparatus 1 of the present embodiment will be described with reference to FIG. 9. The information processing method may be executed periodically.

In step S1, the controller 11 detects the vehicle 2 before parking.

In step S2, the controller 11 determines the characteristic of the vehicle 2 or the characteristic of the driver of the vehicle 2 while referring to the storage unit 13.

In step S3, the controller 11 sets a parking frame for the vehicle 2 in accordance with the determined characteristic.

In step S4, the controller 11 transmits information indicating the parking frame to the vehicle 2. As an additional example, the controller 11 may cause a light emitting body to emit light so as to display the parking frame, the light emitting body being part of light emitting bodies embedded in a road surface of the parking lot and being embedded at a position corresponding to the parking frame.

As described above, according to the present embodiment, in a case where the vehicle 2 before parking is detected, the controller 11 of the information processing apparatus 1 determines the characteristic of the vehicle 2 or the characteristic of the driver of the vehicle 2, sets a parking frame for the vehicle 2 in accordance with the characteristic, and transmits information indicating the parking frame to the vehicle 2. With such a configuration, the information processing apparatus 1 can variably set a parking frame in accordance with the characteristic of the vehicle 2 and thus the size of each parking frame can be reduced to the minimum size needed. Therefore, with the information processing apparatus 1, it is possible to increase the number of vehicles accommodated in a parking lot and improve the efficiency of accommodation.

In addition, according to the present embodiment, the controller 11 superimposes the parking frame on an image captured by the imaging unit 24 of the vehicle 2 and causes the display unit 25 of the vehicle 2 to display a superimposed image. With this configuration, the information processing apparatus 1 can assist a driver checking the parking frame.

In addition, according to the present embodiment, the characteristic of the vehicle 2 includes the size of the vehicle 2. The parking frame secures at least the size of vehicle 2. With this configuration, the information processing apparatus 1 can secure the minimum parking frame needed.

In addition, according to the present embodiment, a characteristic of the vehicle 2 is a door opening and closing method of the vehicle 2 and the controller 11 sets the parking frame at a position where an additional width needed to open and close a door is secured between the vehicle 2 and the adjacent vehicle 3. In addition, the characteristic of the driver includes a characteristic that the driver loads and unloads a luggage and the controller 11 sets the parking frame at a position where an additional width needed to load and unload the luggage is secured between the vehicle 2 and the adjacent vehicle 3. Furthermore, the parking frame includes a margin width for the driver of the vehicle 2 to pass after getting off the vehicle 2. With this configuration, the information processing apparatus 1 can set a high-convenience parking frame in consideration of various factors associated with parking.

In addition, according to the present embodiment, one or more light emitting bodies are embedded in a road surface of a parking lot. The controller 11 further causes a light emitting body to emit light, the light emitting body being part of the one or more light emitting bodies and being embedded at a position corresponding to the parking frame. With this configuration, the information processing apparatus 1 can make it easier for the driver to check the position of the parking frame.

Although the present disclosure has been described with reference to the drawings and examples, it should be noted that those skilled in the art may make various changes and modifications based on the present disclosure. Other modifications without departing from the scope of the disclosure can also be made. For example, the functions or the like included in each means or each step can be rearranged without logical inconsistency, and a plurality of means or steps can be combined with each other or be divided.

For example, in the above-described embodiment, a program for all or part of the functions or processing of the information processing apparatus 1 can be recorded on a computer-readable recording medium. Examples of the computer-readable recording medium include a non-transitory computer-readable medium. For example, the computer-readable recording medium is a magnetic recorder, an optical disc, a magneto-optic recording medium, or a semiconductor memory. Distribution of the program is performed, for example, by selling, handing over, or renting a portable recording medium such as a digital versatile disc (DVD) or a compact disc read-only memory (CD-ROM) on which the program is recorded. In addition, the distribution of the program may be performed by storing the program in a storage of any server and transmitting the program from the server to another computer. The program may also be provided as a program product. The present disclosure can also be realized as a program that can be executed by a processor.

For example, a computer temporarily stores the program recorded on the portable recording medium or the program transferred from the server in a main storage device. Then, the computer reads the program stored in the main storage device by means of a processor, and executes processing according to the read program by means of the processor. The computer may read the program directly from the portable recording medium and execute the processing according to the program. The computer may sequentially execute the processing according to the received program each time the program is transferred from the server to the computer. The processing may be executed through a so-called ASP type service that realizes a function by means of an execution instruction and acquisition of results without transfer of the program from the server to the computer. The "ASP" is an abbreviation of "application service provider". The program includes information that is provided for processing executed by a computer and is equivalent to the program. For example, data that is not a direct command with respect to a computer but has a property of defining processing of the computer corresponds to "information equivalent to the program".

What is claimed is:

1. An information processing apparatus communicable with a vehicle, the information processing apparatus comprising one or more processors configured to
    detect the vehicle before parking,
    determine a characteristic of a driver of the vehicle,
    set a parking frame for the vehicle in accordance with the characteristic, and
    transmit information indicating the parking frame to the vehicle;
wherein:
    the characteristic of the driver includes a characteristic that the driver loads and unloads a luggage;
    the one or more processors are configured to set the parking frame at a position where an additional width needed to load and unload the luggage is secured between the vehicle and an adjacent vehicle; and
    the parking frame includes a margin width for the driver of the vehicle to pass after getting off the vehicle.

2. The information processing apparatus according to claim 1, wherein the one or more processors are configured to superimpose the parking frame on an image captured by an imaging unit of the vehicle based on the information indicating the parking frame and cause a display unit of the vehicle to display a superimposed image.

3. The information processing apparatus according to claim 1, wherein:
    the one or more processors are configured to set the parking frame in a parking lot;
    one or more light emitting bodies are embedded in a road surface of the parking lot; and
    the one or more processors are configured to cause a light emitting body to emit light, the light emitting body being part of the one or more light emitting bodies and being embedded at a position corresponding to the parking frame.

4. The vehicle comprising the information processing apparatus according to claim 1 mounted in the vehicle.

5. A non-transitory storage medium storing instructions that are executable by one or more processors included in an information processing apparatus communicable with a vehicle and that cause the one or more processors to perform functions comprising:
    determining a characteristic of a driver of the vehicle in a case where the vehicle before parking is detected;
    setting a parking frame for the vehicle in accordance with the characteristic; and
    transmitting information indicating the parking frame to the vehicle;
wherein:
    the characteristic of the driver includes a characteristic that the driver loads and unloads a luggage;
    the functions further comprise setting the parking frame at a position where an additional width needed to load and unload the luggage is secured between the vehicle and an adjacent vehicle; and
    the parking frame includes a margin width for the driver of the vehicle to pass after getting off the vehicle.

6. The non-transitory storage medium according to claim 5, wherein the functions include superimposing the parking frame on an image captured by an imaging unit of the vehicle based on the information indicating the parking frame and causing a display unit of the vehicle to display a superimposed image.

7. An information processing method executed by an information processing apparatus communicable with a vehicle, the information processing method comprising:
    detecting the vehicle before parking;
    determining a characteristic of a driver of the vehicle;
    setting a parking frame for the vehicle in accordance with the characteristic; and
    transmitting information indicating the parking frame to the vehicle;
wherein:
    the characteristic of the driver includes a characteristic that the driver loads and unloads a luggage;
    the method further comprising setting the parking frame at a position where an additional width needed to load and unload the luggage is secured between the vehicle and an adjacent vehicle; and the parking frame includes a margin width for the driver of the vehicle to pass after getting off the vehicle.

8. The information processing method according to claim 7, further comprising superimposing the parking frame on an image captured by an imaging unit of the vehicle based on the information indicating the parking frame and causing a display unit of the vehicle to display a superimposed image.

* * * * *